Patented Nov. 17, 1925.

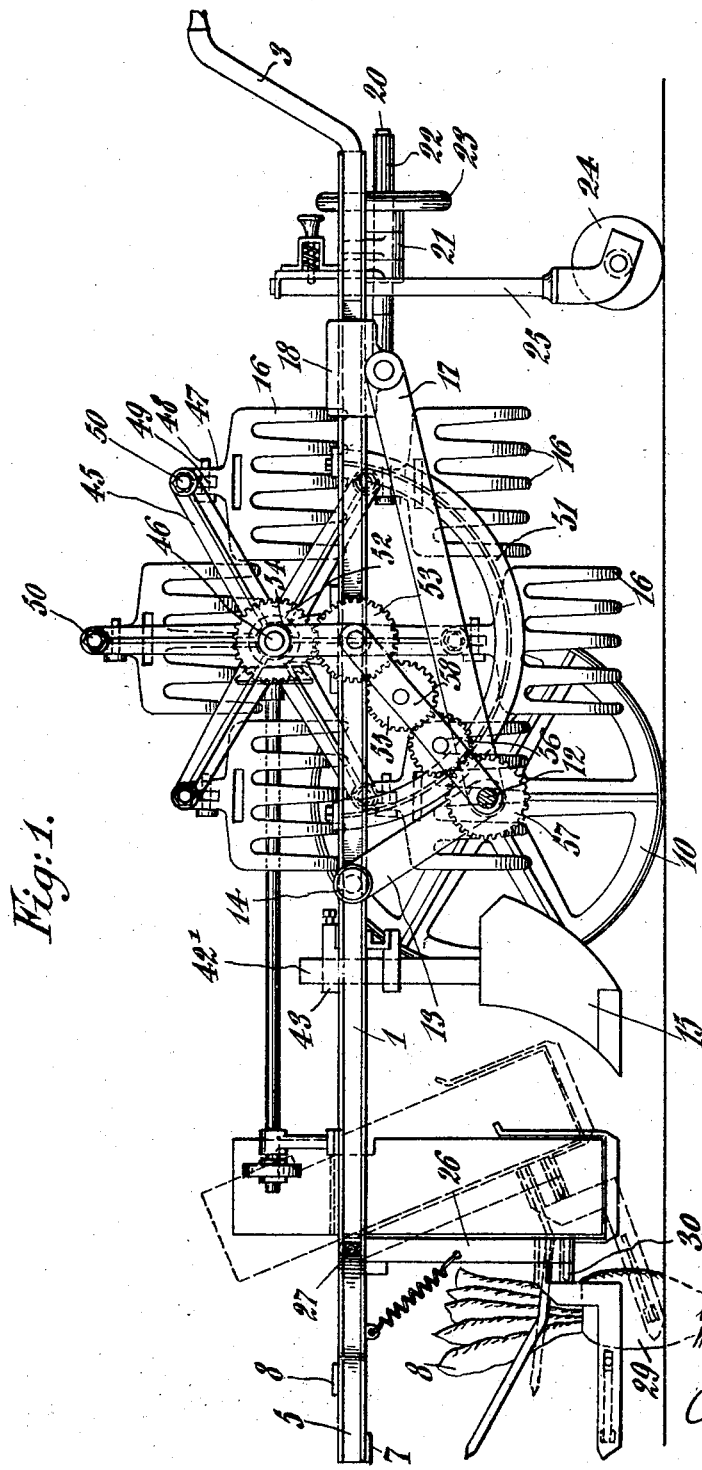

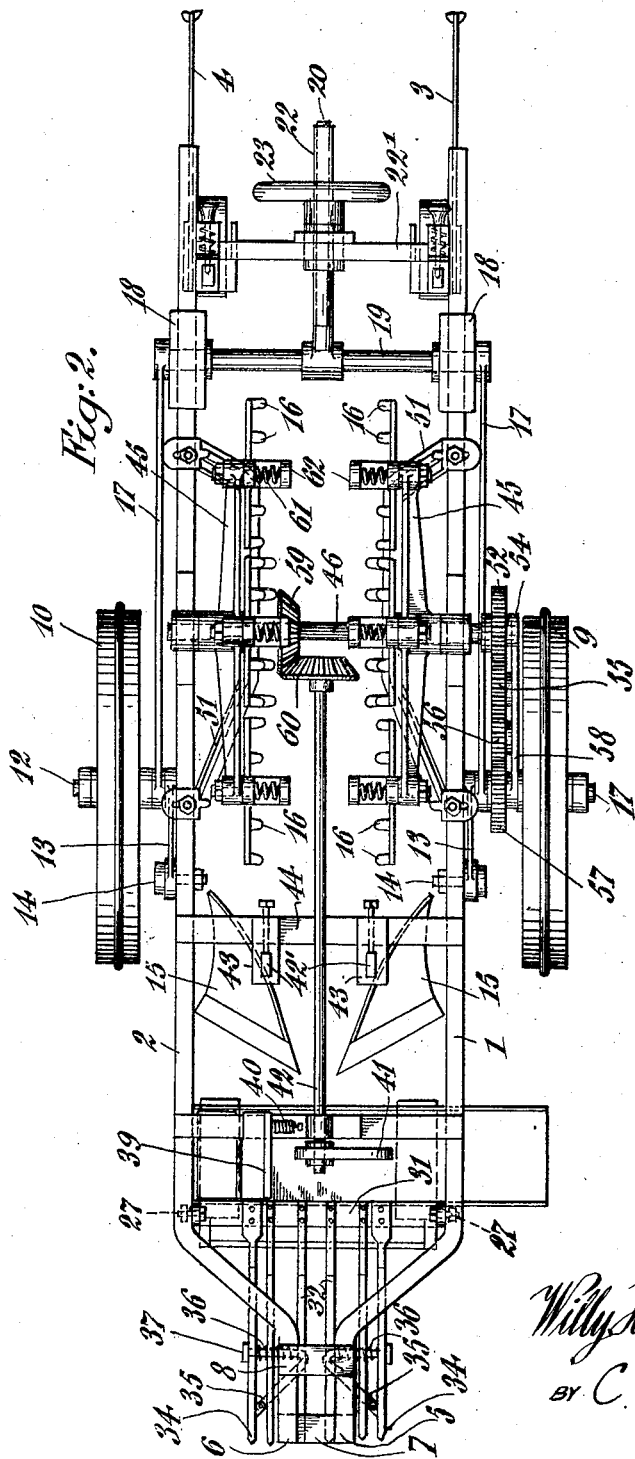

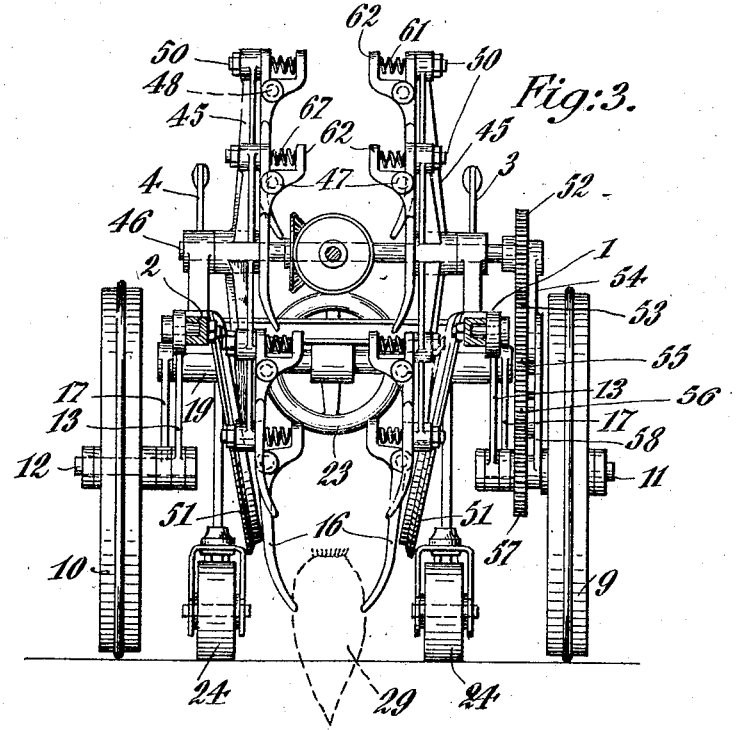
Fig:3.
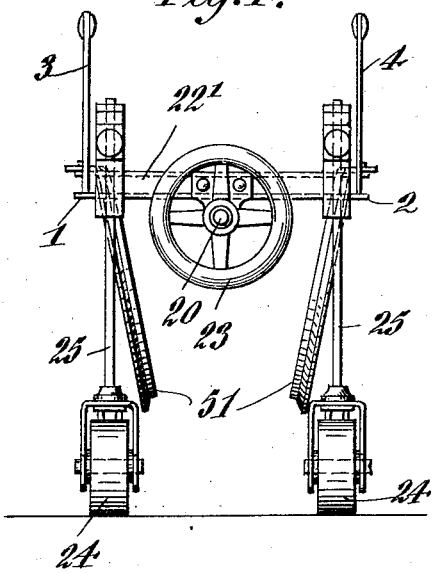
Fig:4.

1,562,167

UNITED STATES PATENT OFFICE.

WILLY HARTENSTEIN, OF DARMSTADT, GERMANY, ASSIGNOR TO JOSEPHINE AMAN, OF LOS ANGELES, CALIFORNIA.

BEET HARVESTER.

Original application filed August 27, 1921, Serial No. 495,926. Divided and this application filed November 24, 1924. Serial No. 751,732.

*To all whom it may concern:*

Be it known that I, WILLY HARTENSTEIN, a citizen of the Republic of Germany, and a resident of Darmstadt, Germany, have invented certain new and useful Improvements in Beet Harvesters, of which the following is a specification.

The present invention relates to improvements in beet harvesters, and more particularly refers to a machine adapted for the harvesting of beets, turnips or the like in which is involved both the preliminary operation of removing the tops of the beets, subsequently excavating the beets from the ground, and finally lifting the beets out of the soil.

An object of the invention is to provide for the efficient topping of the beets by the use of a knife supported for a pivotal or hinged movement at the forward portion of the framework of the harvester and mounted in conjunction with the tentacles or fingers which engage about and enter the leaves or top growth of the beet for the purpose of moving and guiding the knife to a correct position for removing the top growth of the beet and severing the same from the beet body without unduly removing excess body portion which is valuable for its sugar content or food value.

Another object of the invention resides in providing in conjunction with the topping knife arms adapted to close about the beet and to hold the beet firmly in position during the action of cutting.

A further object of the invention resides in providing excavating plows for digging the beets and severing their roots from the soil, such plows being mounted upon the framework of the machine and being adjustable with the framework in order that the depth of the plows may be suitably gaged.

A still further object of the invention resides in providing in rear of the excavating plows a fork lifting device for the beets adapted to be put in motion upon movement of the machine and to derive its actuation from the ground wheels upon which the harvester framework is supported.

The invention also contemplates the provision of adjusting means for the framework as to height in order that the plows and the lifters may be raised and lowered appropriately to suit different varieties of beets or a difference in the character of soils.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a view in side elevation of an improved beet harvester constructed according to the present invention;

Fig. 2 is a top plan view thereof;

Fig. 3 is a cross sectional view taken through the machine; and

Fig. 4 is a rear end view with certain of the parts left out for clearness.

Referring more particularly to the drawings, 1 and 2 designate parallel side rails of the main framework of the machine to which may be connected at the rear handles 3 and 4, such rails being made to converge at their front ends and provided with parallel, closely situated extremities 5 and 6 connected by cross bars 7 and 8. The framework is suitably strengthened by cross braces at appropriate points and is supported upon the ground wheels 9 and 10 having the stub axles 11 and 12. These axles are pivotally coupled at their inner ends to links 13 which in turn are pivoted at 14 to the side rails 1 and 2 respectively.

The wheels 9 and 10 are intended to swing upon the links 13 in order that the framework may be raised and lowered as required to gage the depth of the excavating plows 15 and the pairs of lifting forks 16 hereinafter referred to in further detail. For the purpose of executing a pivotal movement of the ground wheels about the centers 14 further links 17 are pivoted to the axles 11 and 12 and to cross heads or sliding members 18 fitted upon the beams 1 and 2 and connected as shown more particularly in Fig. 2 by a shaft 19. This shaft 19 is coupled to a worm shaft 20 extending centrally of the machine and longitudinally thereof and passing through suitable hangers 21 depending from a beam 22' which extends transversely of the machine and is supported by the side rails 1 and 2.

A sleeve 22 is mounted upon the worm shaft 20 and is rotated by means of a hand wheel 23. The sleeve 22 and hand wheel 23 are restrained against an axial travel but may rotate freely in either direction to cause the feeding of the worm shaft 20 either forwardly or rearwardly. This movement in the worm shaft 20 is attended by a corresponding shifting of the crossing shaft 19 and the cross heads 18 and consequently the links 17 are caused to swing the wheels 10 and the links 13 about the pivot centers 14.

The wheels 24 at the rear portion of the framework are casters and are carried upon the standards 25 which have a swiveling movement in the harvester framework. These casters however form no particular part of the invention.

At the forward portion of the machine are mounted a pair of arms 26 which depend from pivotal connections 27 had with the rails 1 and 2. A topping knife 30 is carried transversely by the lower portions of the arms 26 at such an elevation as to come between the top 28 and the body 29 of a beet such as shown in Fig. 1. The knife 30 is intended to sever the leaves or top portions 28 from the body 29 of the beet, and inasmuch as the line of cleavage varies as to elevation the knife 30 is pivotally supported through the arms 26 in order that it may accommodate itself to the desired horizontal position and thus come correctly to a point where it may behead the beet with as little loss of the body portion as practicable.

The sugar producing portion of the beet, or where the beet is of a different variety, the edible portion thereof is thus saved. A beam 31 is connected between the arms 26 above the knife 30 and provides a convenient means to which to attach a number of fingers or tentacles 32 which are bent diagonally upward as indicated in Fig. 1, and are adapted to engage in and about the leaves or top portion 28 of the beet in order to force the arms 26 and the knife 30 backwardly, for instance, to the dotted line position indicated in Fig. 1. This action is resisted by one or more coil springs 33 connected between the arms 26 and the framework, although this resistance of the spring 33 is a yieldable resistance such as will permit the backward shifting of the knife and its associated parts, and the spring has a further function to restore these parts to the initial forward position after the top has been removed so as to place the machine in readiness to operate upon a subsequent beet.

The beam 31 also forms a support for lateral, downwardly offset guide bars 34 having a pair of rearwardly convergent arms 35 pivoted thereto and positioned to embrace the sides of the body 29 of the beet. The rear ends of the arms 35 are rounded and urged centrally or mutually toward one another by coil springs 36 wound about guide bolts 37 engaged through the bars 34. These pivoted arms 35 are of course moved outwardly by the beet body 29 during the passage of the machine, and as soon as the beet has been past the coil springs 36 close the arms to their centrally convergent position behind or in advance of the beet and thus hold it and form an abutment for the beet body during the cutting action of the top 28 by the knife 30.

On removal of the top 28 the latter is delivered to a container 38 situated in rear of the knife in position to receive the tops and which contains a laterally vibrating shovel 39 pivoted for lateral vibration in the container 38 and held in an initial position by a coil spring 40 while being vibrated in an opposite direction by a cam 41 on a longitudinally extending shaft 42 mounted centrally of the main framework and at an elevation preferably above the rails 1 and 2.

The container 38, as indicated in dotted lines in Fig. 1, is capable of partaking of a swinging movement with the arms 26 to at all times have this container at a correct position with reference to the knife 30 where it will receive the tops 28 as they are severed. The action of the shovel 39 will remove the tops 28 from the container and arrange them in a row along side of the path of the machine.

In rear of the topping knife and its appurtenant parts are the shovels 15, being two in number as indicated in Fig. 2, and supported by the stocks 42′ held in clamps 43 which are sustained by a transverse beam 44. The clamps 43 admit of an adjustment of the plows 15 as to height and such clamps may also be adjustable laterally upon the beam 44 in order to vary the gap between the plows to agree with the root conditions of the beets or the size of the vegetables.

These shovels are intended to sever the roots of the beets and to put them in condition to be lifted from the soil by the action of the forks 16 which follow. These forks 16 are carried upon the arms 45 of two spiders which are situated apart and journaled in common upon a transverse shaft 46 journaled upon suitable bearings mounted upon the side rails 1 and 2. The forks 16 are bifurcated at their upper ends as indicated at 47 to receive longitudinally extending pins 48 which connect them with togues 49 depending from bolts 50 which lie transversely and pivotally support the tongues 49 in the outer ends of the spider arms 45. The forks 16 thus have a transversely swinging movement about the pins 48 and a longitudinally swinging motion about the bolts 50. The transverse swinging movement enables the forks 16 to approach one another upon the beet at the lower portions of their movement, for instance, as shown in Fig. 3, while the pins 50 allow the forks 16 to always assume a depending position with respect to the arms 45.

The forks 16 are made to approach one another by cam segments 51 mounted upon the rails 1 and 2 and having a suitable inclination appropriate to swing the forks 16 a desired distance. The forks 16 are provided with a suitable number of tines, preferably five, and they are formed concave on their inner faces, as indicated in Fig. 3, so that the lower extremities of the tines may project suitably to engage the body portion of the beet.

The shaft 46 carries at one end the gear wheel 52 meshing with the gear wheel 53. A link 54 on the shaft 46 carries the gear wheel 53 for pivotal movement about the periphery of the gear wheel 52. Two other gear wheels 55 and 56 are interposed between the gear wheel 53 and an initial gear wheel 57 upon the stub axle 11 of the ground wheel 9. A link 58 connects the four gear wheels 53, 55, 56 and 57 and supports the intermediate gear wheels 55 and 56 and has a pivotal connection with the lower portion of the link 54.

A bevel gear wheel 59 is mounted upon the shaft 46 between the spiders and meshes with a second bevel pinion 60 on the shaft 42. This arrangement is intended to drive the cam 41 as the machine progresses.

In operation, the machine is either drawn along by draft animals or by a tractor, and the tentacles or fingers 32 engaging the tops 28 of the beets cause the swinging of the arms 26 and the container 38 backwardly to the end that the topping knife 30 may be brought to a correct position between the tops and the beet bodies. The guide bars 34 also engage about the sides of the beet body and the pivoted arms 35 close thereabout to hold the beet for the topping operation. After such topping operation the top is removed to a recepacle 38 and is expelled by the shovel 39.

The machine moves along until the shovels 15 come into contact with the beet body or the soil thereabout, cutting the roots and lifting the beet partially. Subsequently, a pair of the forks 16 close about the body portion 29 of the beet, as best shown in Fig. 3, when, by reason of the rotation of the forks to a lower position, they encounter the cam segments 51. Upon further rotation in a counterclockwise direction as looked at from Fig. 1, which is the direction of the wheels 9 and 10, brought about by the arrangement of the gearing shown, the beet bodies are lifted suitably from the ground to insure their severance from the roots and from the soil.

After the beet and the forks 16 holding the same reach a predetermined elevation above the influence of the cam segments 51, springs 61 interposed between the spider arms and offset end 62 of the forks act to return the forks to an initial position where they swing away from the beet above or outwardly away from each other. Thus releasing their grasp upon the beet, the latter will drop to the ground. The beets may be subsequently picked by hand or a machine.

From time to time as the character of the soil or a different variety of beet makes it necessary, the ground wheels 9 and 10 are adjusted so as to raise or lower the main frame together with the plows 15 and the forks 16, as also the topping knife 30. It is well known to those in this art that edible beets have a larger diameter than sugar beets, and consequently the plows 15 will have to be set further apart when operating upon the former and it will not be necessary to swing the forks 16 so closely together, as desirable when harvesting sugar beets. For this purpose cam segments 51 of a suitable gage and pitch are selected to cause the movement of the forks 16 together to a corresponding degree.

The hand wheel 23 may be resorted to from time to time to cause a swinging of the ground wheels about the main framework and a commensurate raising and lowering of the framework and the plows, forks and other parts carried thereby.

It will be appreciated from the foregoing that the present invention provides an improved harvester for beets, turnips or the like in which the three-fold operation of topping, excavating, and lifting the beets is accomplished by mechanisms included in a compact machine, and which further provides for the removal of the tops to the side of the machine in a row where they may be readily piled up or removed. The machine secures its movement for its various operations from the motion of the harvester.

It is obvious that various changes and modifications may be made in the details of construction and design of the above specifically described embodiment of this invention without departing from the spirit thereof, such changes and modifications being restricted only by the scope of the following claims.

This application is a division of my original application filed August 27, 1921, Serial No. 495,926, issued Dec. 2, 1924, as Patent No. 1,517,559.

What is claimed is:

1. In an agricultural machine, a framework, a pair of depending links pivoted at their upper ends to the opposite sides of the framework, an axle in the lower end of each link, a wheel on each axle for supporting the framework, a longitudinally shiftable member on the framework, a second pair of links pivoted at one end to said member and each pivoted at its other end to one of the axles, means for moving said member to raise and lower the framework on the wheels, a shaft on the framework, an agricultural machine on the shaft, a pair of pivotally connected links extending between the shaft and an axle, and a train of gear wheels connecting the shaft and axle and carried thereby and by said pivotally connected links.

2. In an agricultural machine, a framework, a pair of pivotally connected links at each side of the framework with their connected ends extending downwardly, means for sliding a link of each pair longitudinally of the framework to raise and lower said connected ends of the links, supporting wheels mounted on said connected ends of the links, an operating shaft on the framework, another pair of pivotally connected links connecting the shaft to the connected ends of one of said first pairs of links, and a train of gear wheels carried by said other pair of pivotally connected links for connecting the shaft to one of the supporting wheels.

3. In an agricultural machine, a framework, two pairs of pivotally connected links with the end link of one pair pivoted to the other pair at their pivotal connection, means for moving one link of said other pair of links along the framework, the other link of said other pair of links being anchored to the framework, an agricultural machine mounted in the frame and connected to the other end link of said one pair of links, a wheel mounted on said other pair of links at their pivotal connection, and transmission means between the wheel and the agricultural machine arranged along said one pair of links for adjustment therewith.

In testimony that I claim the foregoing as my invention, and have signed my name hereto.

Dr. Ing. WILLY HARTENSTEIN.